United States Patent
Naiki et al.

(10) Patent No.: US 7,038,654 B2
(45) Date of Patent: May 2, 2006

(54) DISPLAY APPARATUS HAVING TEMPERATURE COMPENSATION FUNCTION

(75) Inventors: Takashi Naiki, Kyoto (JP); Haruo Taguchi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 385 days.

(21) Appl. No.: 10/641,460

(22) Filed: Aug. 14, 2003

(65) Prior Publication Data
US 2004/0041762 A1    Mar. 4, 2004

(30) Foreign Application Priority Data
Aug. 27, 2002    (JP) ............................. 2002-246325

(51) Int. Cl.
*G09G 3/36*    (2006.01)

(52) U.S. Cl. ......................................... 345/101; 345/87
(58) Field of Classification Search ............ 345/87–88, 345/90, 98–101, 204, 211, 214
See application file for complete search history.

(56) References Cited

U.S. PATENT DOCUMENTS

| 6,037,920 | A  | * | 3/2000  | Mizutome et al. | ............ | 345/87 |
| 6,320,571 | B1 | * | 11/2001 | Takahashi et al. | .......... | 345/204 |
| 6,326,959 | B1 | * | 12/2001 | Tanaka | ....................... | 345/211 |
| 6,803,899 | B1 | * | 10/2004 | Masazumi et al. | .......... | 345/101 |

\* cited by examiner

*Primary Examiner*—Ricardo Osorio
*Assistant Examiner*—Mansour M. Said
(74) *Attorney, Agent, or Firm*—Hogan & Hartson, LLP

(57) ABSTRACT

The invention provides a display apparatus having a temperature sensor and a step-up circuit generating a drive voltage of the display apparatus by stepping up a power source voltage. The temperature sensor provides temperature data indicative of the temperature of the display panel with a reduced measurement error without limiting the operation of the step-up circuit. To do so, in view of the fact that the step-up circuit has alternating active state in which the circuit is stepping up a source voltage to output a required step-up voltage and inactive state in which no stepping operation is made, the temperature sensor is adapted to obtain temperature data while the step-up circuit is inactive. The temperature data obtained is supplied to a temperature compensation means for changing the drive condition setting value that define the drive condition of the display panel to compensate for the temperature change.

12 Claims, 10 Drawing Sheets

DISPLAY APPARATUS HAVING TEMPERATURE COMPENSATION FUNCTION

FIELD OF THE INVENTION

The invention relates to a display apparatus utilizing, for example, liquid crystal display (LCD) and organic electroluminescent display (ELD).

BACKGROUND OF THE INVENTION

Display apparatuses utilizing LCD and ELD have a step-up circuit for stepping up a given power source voltage to a drive voltage for driving the display. Expressive power of such display means have been increasingly improved in recent years. For example, display apparatuses of compact communications apparatuses such as PDAs and cellular phones have a high-resolution, varied gradation ability (ranging from monochrome to multi-color gradation), multi-color capability (ranging from monochrome to full colors). To drive LCD and ELD elements in a multi-color mode, it is necessary to drive them under an optimum driving condition. For this reason, it is necessary for a display apparatus to have means for accurately following the temperature dependent threshold voltage and the response time of the LCD and the ELD elements used to compensate for a change in temperature, correcting the drive conditions of these elements. In what follows an LCD element will be discussed as a typical example.

An LCD panel is conventionally equipped with a temperature sensor for providing digital temperature data of the display panel. The data can be used to control the display panel to be operated in the optimum condition (see the Japanese Patent Early Publication No. H5-273941).

In conventional LCD apparatuses, measurement of the temperature is performed as it is needed. Therefore, the temperature measurement is performed independently of the control of the step-up circuit.

Generally, a temperature sensor is adapted to detect temperature by detecting a minute change in voltage or current within a circuit. When the step-up circuit is stepping up a power source voltage towards a required step-up voltage through switching operation of switches (then the circuit is referred to as being in active state), it is likely that the switching operation generates a voltage noise on, for example, power supply lines, ground lines, and signal lines involved. Voltage noise also appears very often when a large drive current is passed to a display panel (that is, when the drive current changes rapidly). The voltage noise becomes large especially when a display apparatus has a step-up circuit, a temperature sensor, and a drive circuit all formed on the same semiconductor substrate. Since voltage noise becomes a source of error in the temperature measurement, accurate temperature compensation of the operating conditions cannot be attained in such display apparatus. It is possible to reduce the voltage noise by increasing the capacity of the power supply source or by increasing the thickness of power supply lines and ground lines. However, it is not a realistic solution, since it causes an increase of cost and increases the dimensions of the display.

SUMMARY OF THE INVENTION

It is, therefore, an object of the invention to provide a display apparatus having a temperature sensor and a step-up circuit for generating a drive voltage of the display apparatus, the temperature sensor capable of detecting the temperature of the display panel with only a negligible measurement error, without limiting the operation of the step-up circuit.

In accordance with one aspect of the invention, there is provided a display apparatus, comprising:
a display panel;
a display memory for storing contents to be displayed on the display panel;
a step-up circuit for stepping up a power source voltage to a predetermined step-up voltage;
a drive circuit receiving the step-up voltage as the drive voltage for driving the display panel based on a drive condition defined by a drive condition setting value to display the contents of the display memory on the display panel;
a temperature sensor for detecting the temperature of said display panel and outputting temperature data associated with the temperature;
a temperature compensation circuit for changing said drive condition setting value, when said temperature data has changed in a period of time in which the current for driving said display panel do not change appreciably, from the drive condition setting value set before said temperature data has changed (said value referred to old drive condition setting value) to a drive condition setting value in accord with the temperature after said temperature data has changed (said value referred to as new drive condition setting value); and
a controller for controlling said display memory, step-up circuit, drive circuit, temperature sensor, and temperature compensation circuit.

In accordance with another aspect of the invention, there is provided a display apparatus, comprising:
a display panel;
a display memory for storing contents to be displayed on the display panel;
a step-up circuit having alternating active state and inactive state, outputting a predetermined step-up voltage by stepping up a power source voltage;
a drive circuit receiving the step-up voltage as the drive voltage for driving the display panel based on a drive condition defined by a drive condition setting value to display the contents of the display memory on the display panel;
a temperature sensor for detecting the temperature of said display panel and outputting temperature data associated with the temperature;
a temperature compensation circuit for changing said drive condition setting value, when said temperature data has changed while said step-up circuit is in inactive state, from the drive condition setting value set before said temperature data has changed (said value referred to old drive condition setting value) to a drive condition setting value in accord with the temperature after said temperature data has changed (said value referred to as new drive condition setting value); and
a controller for controlling said display memory, step-up circuit, drive circuit, temperature sensor, and temperature compensation circuit.

In accordance with still another aspect of the invention, there is provided a display apparatus, comprising:
a display panel;
a display memory for storing contents to be displayed on the display panel;

a charge pump type step-up circuit in continuous step-up operation stepping up a power source voltage to output a step-up voltage;

a drive circuit receiving the step-up voltage as the drive voltage for driving the display panel based on a drive condition defined by a drive condition setting value to display the contents of the display memory on the display panel;

a temperature sensor for detecting the temperature of said display panel and outputting temperature data associated with the temperature;

a temperature compensation circuit for changing said drive condition setting value, when said temperature data has changed in a second predetermined period of time after a first predetermined period immediately after a switch of said charge pump type step-up circuit is switched ON, from the drive condition setting value set before said temperature data has changed (said value referred to old drive condition setting value) to a drive condition setting value in accord with the temperature after said temperature data has changed (said value referred to as new drive condition setting value); and a controller for controlling said display memory, step-up circuit, drive circuit, temperature sensor, and temperature compensation circuit.

The temperature sensor is operated only in a predetermined period within an inactive period of said step-up circuit but not in a predetermined initial segment of said inactive period.

The temperature sensor is continuously operated. In this case, only the temperature data that is obtained in a predetermined period within an inactive period of said step-up circuit but not in a predetermined initial segment of said inactive period is used as the temperature data for changing said drive condition setting value to said new drive condition setting value.

Alternatively, the temperature sensor may be operated only in a second predetermined period after a first predetermined period immediately after said switch of said charge pump type step-up circuit is switched ON.

Still alternatively, the temperature sensor may be continuously operated while validating only the temperature data that are detected in a second period after a predetermined period immediately after said switch of said charge pump type step-up circuit is switched ON.

Moreover, the temperature compensation circuit is configured to establish at least one intermediate drive condition setting value between the old drive condition setting value and the new drive condition setting value so that the drive circuit undergoes sequential transitions from the drive condition defined by the old drive condition setting value to the new operating condition defined by the new drive condition setting value via the intermediate drive condition defined by the at least one intermediate drive condition setting vale, with a predetermined transition period.

In the inventive display apparatus, in order to change drive condition setting data, a temperature compensation circuit uses the temperature data detected by a temperature sensor in: A period in which the step-up circuit is in inactive state (the period referred to as inactive period); a second predetermined period after a first predetermined period immediately after the switch of said charge pump type step-up circuit is switched on; and a period in which the current driving the display panel does not change appreciably. Therefore, the influence of the voltage noise generated by the stepping up of a source voltage and driving the display panel and appearing on the power supply lines, ground lines, and signal lines can be circumvented. Thus, desirable temperature compensation can be attained.

Alternatively, the temperature sensor may be operated, as needed, only for a period not influenced by the noise, power consumption by the temperature measurement can be reduced.

It is noted that by placing the temperature sensor in constant operation, and employing the temperature data obtained in a period which is not influenced by the noise, reliable temperature data can be provided without any delay.

The display apparatus may proceed to the new drive conditions through intermediate levels in a finite transition period, avoiding a rapid change in drive condition, and a drastic change in brightness for example of the display screen. The display screen can change so smoothly that no abrupt change will appear.

DETAILED DESCRIPTION OF THE PREFERRED EMBODIMENT

Preferred embodiments of a display apparatus of the invention will now be described with reference to the accompanying drawings.

Figure 1:
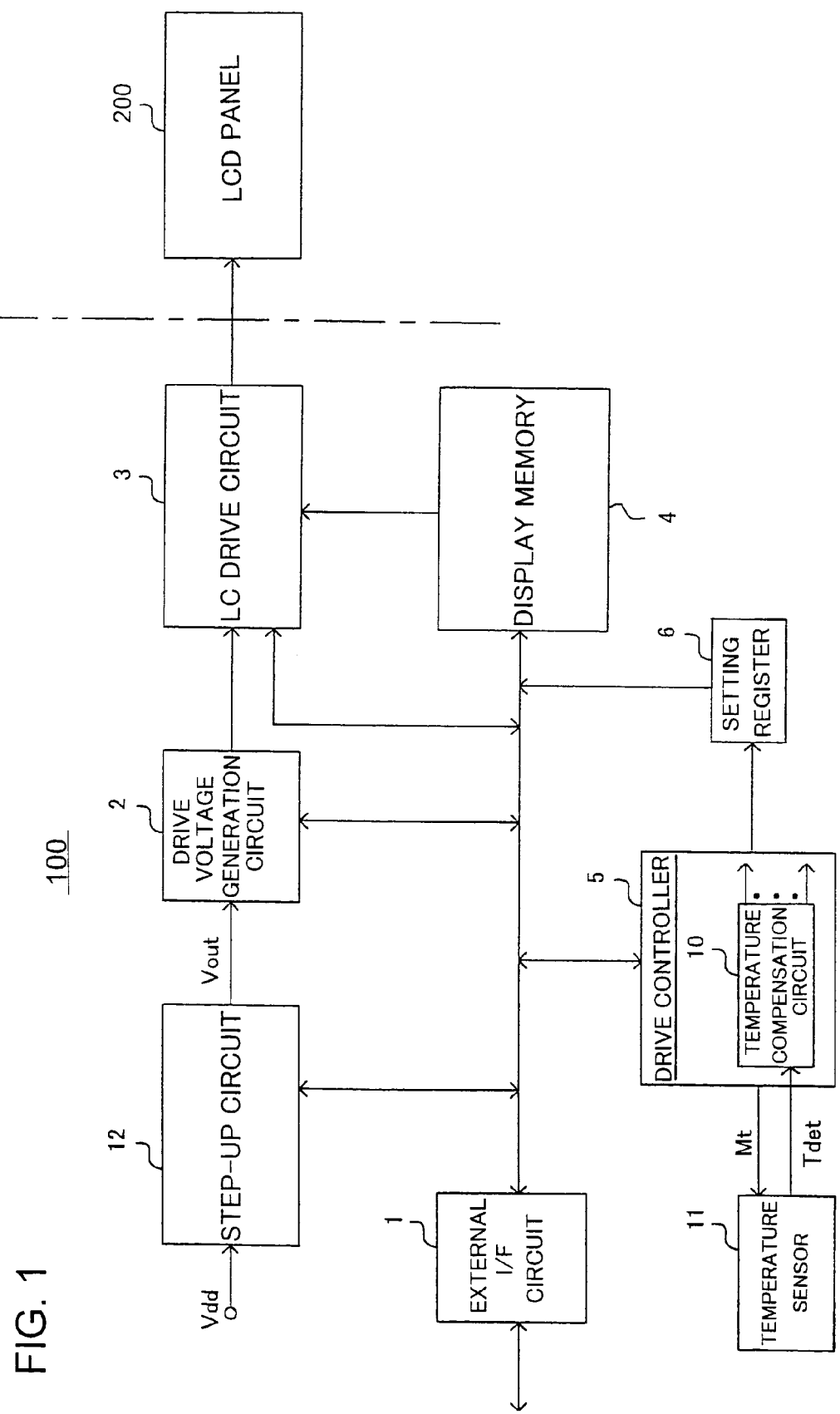
FIG. 1 is a block diagram representation of an embodiment of a system according to the invention.

Referring to FIG. 1, there is shown a drive 100 for driving an LCD display panel 200 of an LCD apparatus according to the invention. The drive will be referred to as LCD drive. The LCD drive 100 has a modular structure in which different modules or components are formed on the same semiconductor device. The LCD drive 100 includes such major components as an external I/F circuit 1, a drive voltage generating circuit 2 constituting a drive circuit together with an LCD drive circuit 3, a display memory 4 comprising a RAM for example, a drive controller 5, a setting register 6, a temperature compensation circuit 10, a temperature sensor 11, and a step-up circuit 12. The temperature compensation circuit 10 is built in the drive controller 5 as shown in FIG. 1. The temperature compensation circuit 10 may be provided within the drive voltage generating circuit 2, or as an independent component. Although the step-up circuit 12 is shown as an independent component, it may be included in the drive voltage generating circuit 2. It should be understood that other minor components such a timing circuit are not shown for simplicity, though they are necessary.

The external I/F circuit 1 interfaces the modular LCD drive 100 with external control devices such as an MPU provided outside the LCD drive 100. The drive voltage generating circuit 2 supplies the LCD drive circuit 3 with the step-up voltage Vout stepped up by the step-up circuit 12 and other drive signals. Upon receipt of the drive voltage from the drive voltage generating circuit 2 and display data for the display memory 4, the LCD drive circuit 3 drives the LCD panel 200 under the control of the drive controller 5.

The setting register 6 stores different sets of setting values(parameters) defining different drive conditions of the LCD drive 100, which include, for example, levels of output voltage, display modes, and frame frequency. The operating conditions of the respective components (e.g. the drive voltage generating circuit 2, LCD drive circuit 3, and display memory 4) are determined based on the setting values held in the setting register 6.

The temperature sensor 11 is provided in proximity to the LCD panel 200 to detect the temperature thereof. The temperature sensor 11 is also built in the same semiconductor device as other components. The semiconductor device is directly formed on the glass surface of the display panel 200 in the form of so-called COG (chip-on glass) configuration. The temperature sensor 11 starts its operation in response to a monitor signal Mt supplied from the drive controller 5, detecting the temperature and providing digital temperature data Tdet.

The digital temperature data Tdet detected by the temperature sensor 11 is supplied to the temperature compensation circuit 10. The temperature compensation circuit 10 can change the drive condition of the LCD panel 200 based on a detected temperature change Tdet, from the old drive condition set before that change to a new drive condition in accord with the new temperature after the change. This can be done by changing various operating parameters (e.g. drive voltage, length of operating period, and timing), Furthermore, the temperature compensation circuit 10 sets up at least one (possibly three) set(s) of intermediate drive conditions between the old drive condition and the new conditions, so that the drive circuit undergoes sequential transitions from the old drive condition to the new drive condition via the intermediate drive condition(s) with a predetermined transition period.

The step-up circuit 12 steps up the source voltage Vdd by means of a charge pump to generate an output voltage Vout. This step-up voltage Vout is supplied to the drive voltage generating circuit 2. There are two types of step-up circuits: A first type adapted to stop its operation when the output voltage Vout has reached the target output voltage and resume its operation when the output voltage Vout has fallen below the target voltage; and a second type adapted to be in constant switching (ON-OFF) operation. The first step-up circuit has a high switching frequency (1 MHz, for example), while the second step-up circuit has a low switching frequency (100 Hz–10 kHz, for example). In the example shown herein, the step-up circuit used is of the first type.

The drive controller 5 is connected to the respective components of the LCD drive 100 (e.g. external I/F circuit 1, drive voltage generating circuit 2, LCD drive circuit 3, display memory 4, drive controller 5, setting register 6, temperature compensation circuit 10, temperature sensor 11, and step-up circuit 12) to control these components. Moreover, the drive controller 5 manages storage of initial setting data received from an external MPU in the setting register 6. In the example shown herein, the LCD drive 100 has a temperature compensation circuit 10, as described above.

Figure 2:
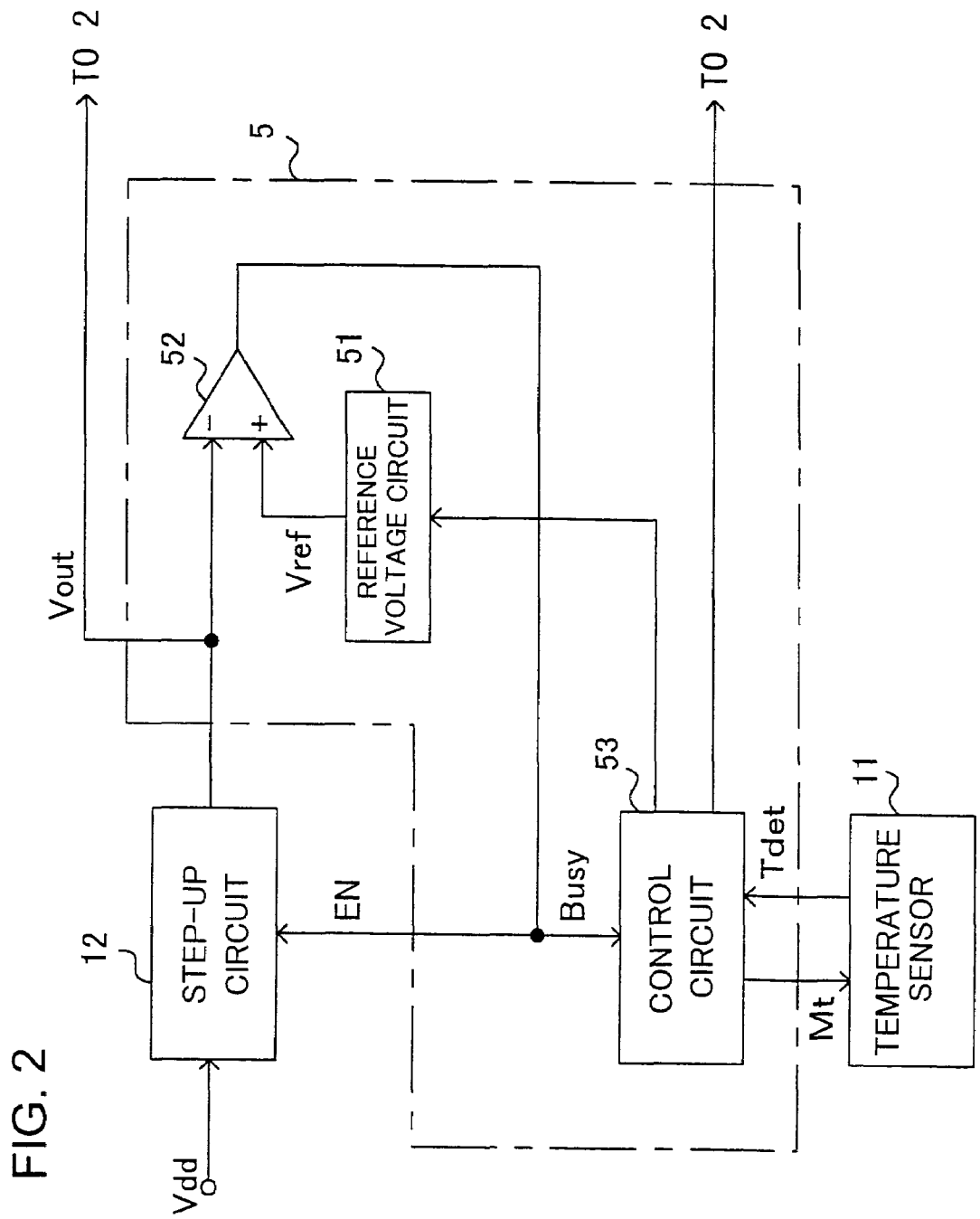
FIG. 2 shows a relevant circuit having a temperature detection function in accordance with a first embodiment of the invention.
Figure 3:
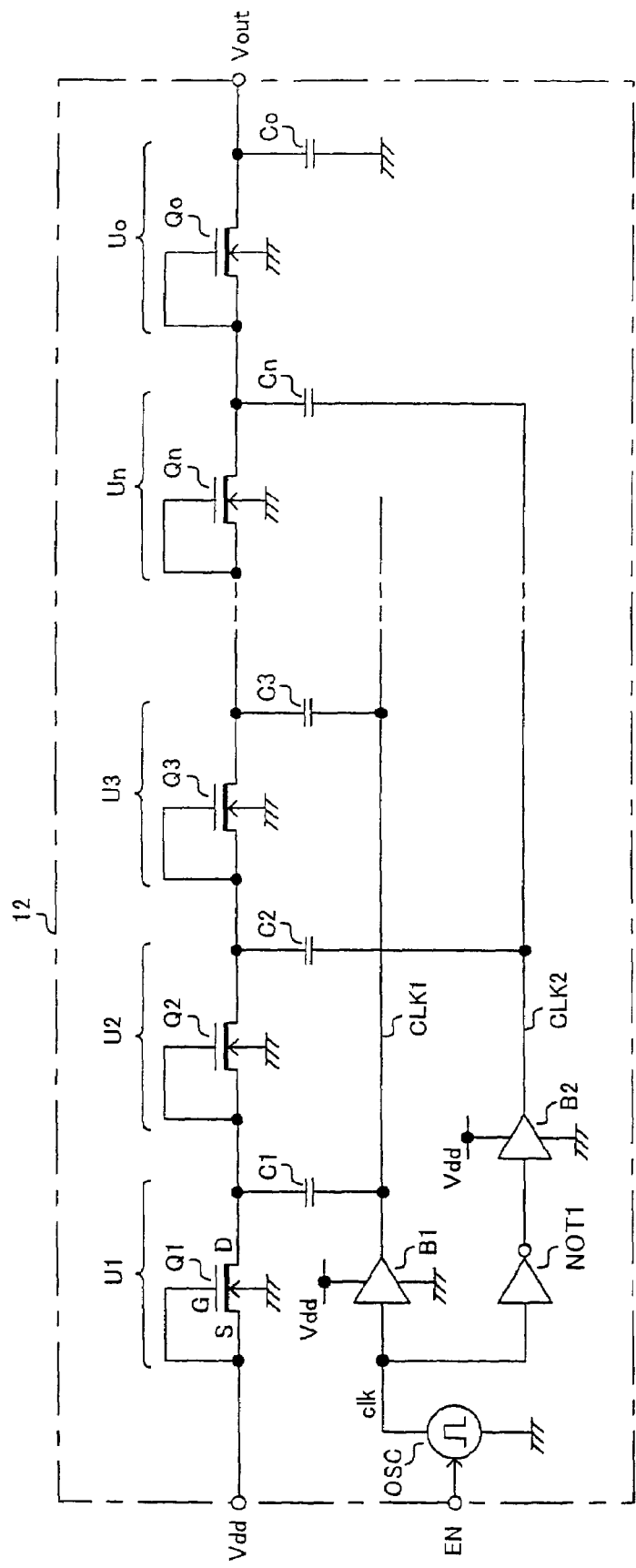
FIG. 3 is a circuit diagram of a step-up circuit.
Figure 4:
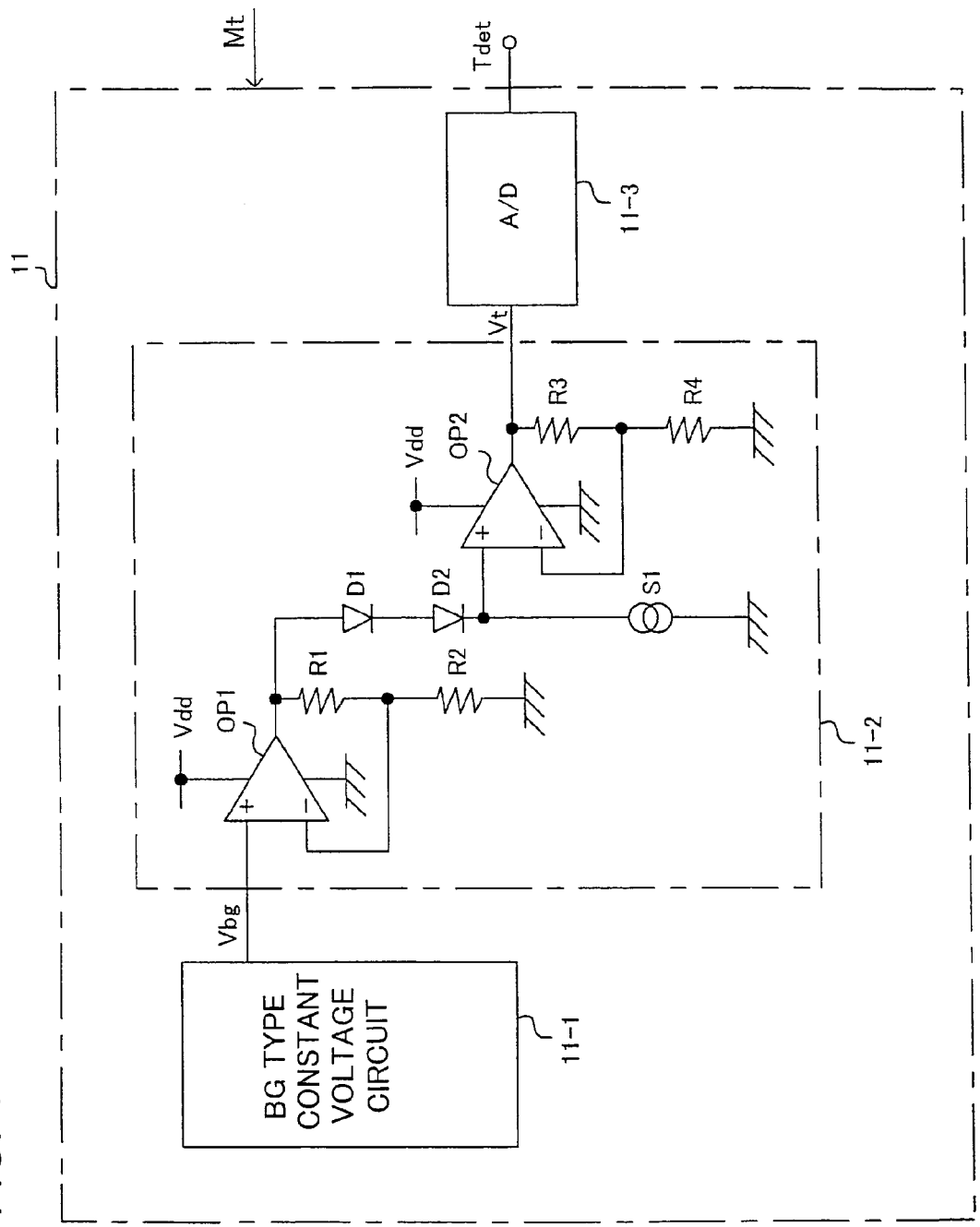
FIG. 4 is a circuit diagram of a temperature sensor.

Referring to FIG. 2, there is shown a block diagram illustrating an arrangement of the temperature sensor 11 and the step-up circuit 12, and drive controller 5, which are relevant to detection of temperature in accordance with the invention. FIGS. 3 and 4 show internal structures of the step-up circuit 12 and the temperature sensor 11, respectively.

As shown in FIG. 2, the step-up voltage Vout obtained from the power source voltage Vdd by the step-up circuit 12 is supplied to the drive voltage generating circuit 2 and to the inverting input terminal (−) of a comparator 52. A reference voltage circuit 51 adjusts an adjustment circuit in response to an instruction data specifying the drive voltage supplied from a control circuit 53 to establish a predetermined reference voltage Vref, and supplies the reference voltage Vref to the non-inverting input terminal (+) of the comparator 52. The comparator 52 compares the step-up voltage Vout with the reference voltage Vref, and generates an enable signal EN and a busy signal Busy when the step-up voltage Vout is lower than the reference voltage Vref. The step-up circuit 12 is operable while it is supplied with the enable signal EN. The control circuit 53 supplies the monitor signal Mt to the temperature sensor 11 while it is not supplied with s busy signal Busy. While supplied with a monitor signal Mt, the sensor 11 in turn supplies digital temperature data Tdet indicative of the temperature at that time to the temperature compensation circuit 10 built in the control circuit 53.

Referring to FIG. 3, it is seen that the step-up circuit 12 is formed of n stages of charge pump units including a first stage charge pump unit U1 and the n-th stage output charge pump unit Un. The first stage unit U1 is supplied with the power source voltage Vdd (of, for example, 2V or 3V). Outputted from the output end of the unit Un is the predetermined step-up voltage Vout (e.g. 10V), which is obtained by stepping up the power source voltage Vdd, via a smoothing circuit Uo consists of an N-type MOS transistor Qo having a source and a gate connected together and a capacitor Co connected between the drain of the transistor Qo and the ground.

The units U1-Un have the same configuration. Take the unit U1 for example. It has an N-type MOS transistor Q1 and a capacitor C1. The source S of the N-type MOS transistor Q1 is supplied with the power source voltage Vdd and connected to the gate G of the transistor Q1, thereby forming a so-called diode connection. The substrate of the transistor is connected to the lowest potential of the circuit or the ground potential. The drain D is connected to the sauce S of the N-type MOS transistor Q2 of the unit U2 in the next stage. The capacitor C1 is connected at one end thereof to the drain D of the transistor Q1 and connected at the other end to a clock line (first clock line CLK1).

It is noted that the capacitors in the odd numbered stages U1, U3, . . . , etc. are connected to a clock line sending a first clock CLK1, while the capacitors in the even numbered units U2, U4, . . . , etc. are connected to a clock line sending a second clock CLK2.

The first clock CLK1 and the second clock CLK2 are 2-phase clocks which have predetermined frequency and the amplitude as the power source voltage Vdd, and have substantially opposite phases each other. The clock signal CLK1 results from the clock signal clk as it is amplified by a first buffer B1. The second clock CLK2 results from the clock signal clk as it is inverted by an inverting circuit NOT1 and amplified by a second buffer B2.

In the step-up circuit shown in FIG. 3, an oscillator OSC oscillates in response to the enable signal EN, generating the clock signal clk. This clock signal clk has a high frequency of, for example, 1 MHz. When the clock signal clk alternately its voltage between H level and L level, it is converted, by the first buffer B1, inverting circuit NOT1, and the second buffer B2, into the first clock CLK1 and the second clock CLK2 having the opposite phases.

The respective units U1-Un start charge pump operations simultaneously with the first and the second clocks CLK1 and CLK2. Thus, the power source voltage Vdd is impressed on the respective units in sequence, resulting in the step-up voltage Vout at the output terminal. During the operation of the step-up circuit 12, the power source voltage Vdd on the power supply line and the voltage on the ground line fluctuate due to the charging of the units, resulting in a noise on the power supply line and the ground line.

The temperature sensor 11 as shown in FIG. 4 consists of a band gap (BG)-type constant voltage circuit 11-1 for generating a constant band gap reference voltage Vbg a temperature detection circuit 11-2 which is adapted to output a thermosense-voltage Vt upon receipt of the BG voltage Vbg indicative of ambient temperature, and an A/D converter 11-3 which is adapted to change the analog thermosense-voltage Vt into a digital temperature data Tdet. The temperature sensor 11 becomes operable when it is supplied with the monitor signal Mt, outputting the temperature data Tdet.

The BG-type constant voltage circuit 11-1 outputs a constant BG voltage Vbg, which is not affected by temperature. In the BG-type constant voltage circuit 11-1, the BG voltage Vbg is obtained by utilizing two diodes, one having a voltage characteristic having a negative temperature coefficient, and the other one having a positive temperature coefficient so that any temperature change cancel out between the two diodes.

The temperature detection circuit 11-2 is formed of an operational amplifier OP1, a resistor R1, and a resistor R2, all together forming a non-inverting amplification circuit. The BG voltage Vbg is applied to the operational amplifier OP1, which generates at the output terminal thereof an amplified constant voltage. The output terminal of the operational amplifier OP1 is connected to a constant current source S1 via the series diodes D1 and D2. Hence, the output voltage of the operational amplifier OP1 minus the voltage drop across the series diodes D1 and D2 is applied to an operational amplifier OP2. The operational amplifier OP2, a resistor R3, and a resistor R4 together form another non-inverting amplification circuit. This non-inverting amplification circuit serves as an output circuit. The voltage drop across the diodes D1 and D2 due to a constant current flowing through them changes with temperature, but changes less at higher temperatures. Therefore, the voltage that amounts to the output voltage of the operational amplifier OP1 minus the voltage drop across the diodes D1 and D2 increases with temperature. As a result, a thermosense-voltage Vt that depends on the temperature is obtained at the output terminal of the operational amplifier OP2, as the output voltage of the diodes is applied to the operational amplifier OP2.

The A/D conversion circuit 11-3 converts the input analog thermosense-voltage Vt into a digital temperature data Tdet before it is outputted from the temperature sensor 11.

The BG-type constant voltage circuit 11-1 and A/D conversion circuit 11-3 can operate in a stable condition without being influenced appreciably by temperature. The temperature detection circuit 11-2 outputs a thermosense-voltage Vt reflecting a temperature change. It should be noted, however, that these circuits are energized by the power source voltage Vdd, and that they are connected to the ground line.

As a consequence, when the power source voltage and/or the ground voltage change(s), or when these voltage is superposed with a noise, the digital temperature data Tdet is likely to contain errors.

Figure 5:
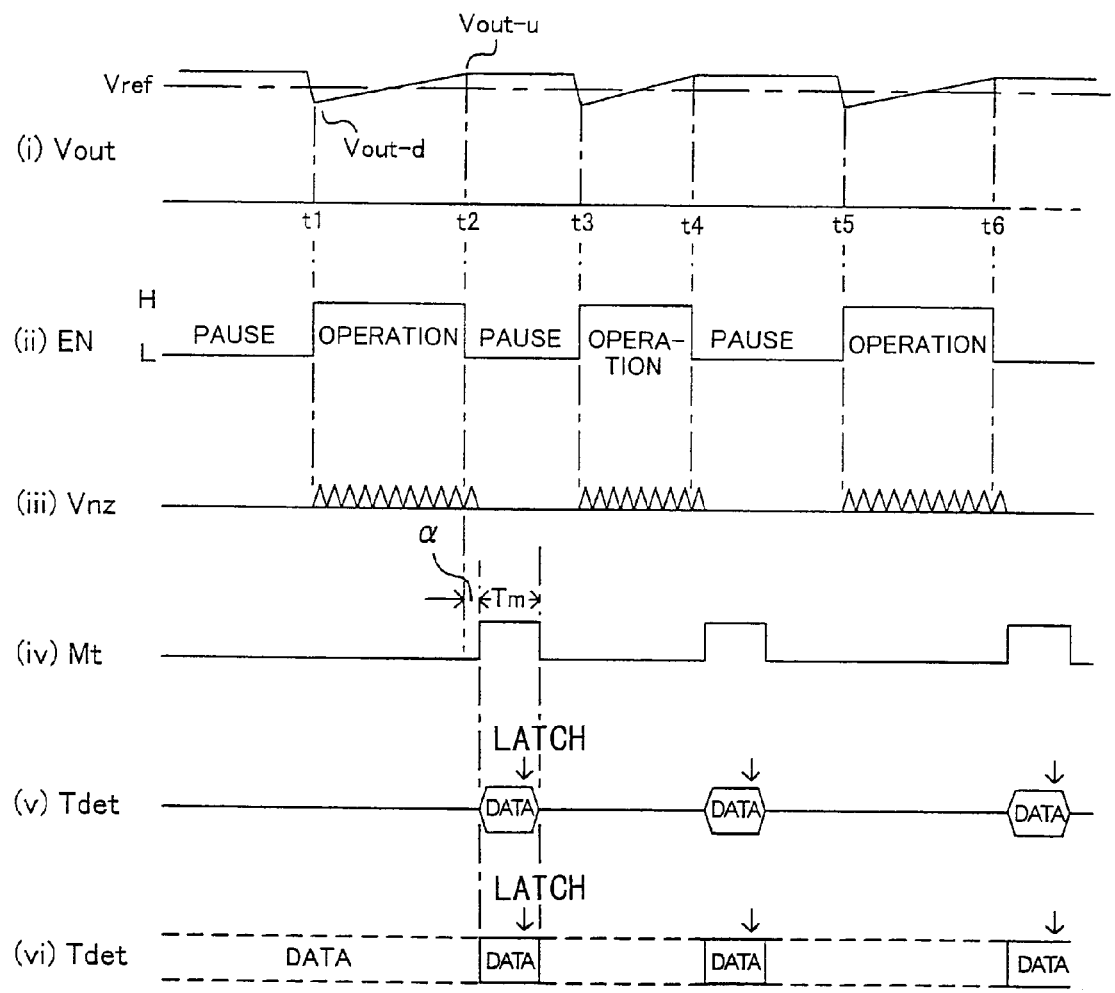
FIG. 5 is a timing diagram of a display apparatus in accordance with an embodiment of the invention.

Referring to FIG. 5, operation of the display apparatus of the invention as shown in FIGS. 1–4 will now be described.

The comparator 52 compares the step-up voltage Vout of the step-up circuit 12 with the reference voltage Vref received from the reference voltage generating circuit 51. In order to perform comparison in a stable manner, the comparator 52 is adapted to exhibit a hysteresis characteristic about the reference voltage Vref As a result, the step-up voltage Vout is controlled to be in a range between a maximum voltage Vout-u and a minimum voltage Vout-d.

It is seen in FIG. 5 that the step-up voltage Vout (curve (i)) initially has a voltage Vout-u, which is the maximum voltage of the hysteresis. Under this condition, the output of the comparator 52 has a low level L, so that no enable signal EN is outputted (that is, the enable signal EN has L level), and the step-up circuit 12 is in inactive state.

As the LCD drive circuit 3 consumes power in driving the display panel for example, the step-up voltage Vout goes down. As the step-up voltage Vout goes down to the minimum voltage Vout-d at time t1 say, the output of the comparator 52 will be inverted to high level (H), supplying a high enable signal EN to the step-up circuit 12.

As shown in FIG. 3, the oscillator OSC of the step-up circuit 12 starts oscillation upon receipt of the enable signal EN, causing the step-up circuit 12 to start its step-up operation. Then, clocked by the clock signal clk of the oscillator OSC, the respective charge-up units are charged with the power source voltage Vdd, thereby building up a step-up voltage Vout.

During this charge-up operation, building up the step-up voltage Vout, the voltage Vdd of the power supply line and the voltage of the ground line fluctuate as shown by a noise voltage Vnz in curve (iii) of FIG. 5, due to charging and discharging of the capacitors C1-Cn and Co and ON/OFF switching of the buffers B1 and B2. The noise voltage Vnz generated during the step-up operation of the step-up circuit 12 causes the semiconductor substrate potential to change accordingly. This noise voltage Vnz continues to remain for a short period of time even after the end of step-up operation.

Referring again to FIG. 5, it is seen that the step-up voltage Vout gradually builds up until it reaches the maximum voltage Vout-u at time t2 say. Then, the output of the comparator 52 is inverted to low level L, thereby stopping the enable signal EN (i.e. pulling down the signal EN to L level). The step-up circuit 12 repeats this operation for a period from t2 to t6 as seen in FIG. 5, maintaining the output voltage Vt at substantially the same level as the reference voltage Vref.

On the other hand, the busy signal Busy (the same as the enable signal) is supplied to the control circuit 53, causing the control circuit 53 to generate the monitor signal Mt, which is supplied to the temperature sensor 11. The three grounded elements 11-1–11-3 of the temperature sensor 11 as shown in FIG. 4 are driven by the power source voltage Vdd. As a consequence, the temperature sensor 11 is likely to be affected by the fluctuation of the supply voltage and the ground voltage as well as by the noise, resulting in errors in the digital temperature data Tdet unless the errors are removed.

It is noted, however, that in the embodiment shown herein, the monitor signal Mt is outputted only in a monitoring period Tm, as described below and shown in FIG. 5 by curve (iv): The monitoring period Tm begin after a period of time a in which the fluctuations of semiconductor substrate potential diminished completely following the end of the step-up operation of the step-up circuit 12. In this way, errors that can otherwise take place in the digital temperature data Tdet are eliminated.

The monitoring period Tm has a sufficient length to detect digital temperature Tdet several times and to calculate a mean value. The length of an inactive period of the step-up circuit 12 is irregular, like its ON period. Thus, the monitoring period Tm is taken to be shorter than the normally anticipated shortest inactive period.

Moreover, instead of taking the monitoring period Tm for each inactive period, it may be taken only once for two or three inactive periods. In this instance, the temperature sensor 11 will operate once in a fixed period that contains multiple inactive periods. When the temperature of the display panel 200 changes little, compensation can be achieved by less frequent temperature measurements, with reduced power consumption.

The control circuit 53 calculates a mean value of the multiple digital temperature data Tdet received from the temperature sensor 11 in the monitoring period Tm. When a significant mean value is obtained, the value is latched as the temperature data for inactive period. The mean value is supplied to the temperature compensation circuit 10.

When a necessary temperature data are not obtained in the multiple inactive periods, detection of the temperature data for the periods is abandoned and uses the previously obtained data as the data for the periods.

The temperature data collected by the temperature sensor 11 while the step-up circuit 12 is in inactive state are used to change drive condition by the temperature compensation circuit 10. Thus, the voltage noise generated in the step-up operation by the charge pumps involved and appearing on the power supply line, the ground line, and the signal lines can be prevented from influencing on the temperature data for accurate temperature compensation.

Since the temperature sensor 11 is operated only in noise-free periods based on the monitor signal Mt generated as needed, power consumption by the temperature sensor 11 can be reduced accordingly.

As another example, only the temperature detection circuit 11-2 and/or the A/D conversion circuit 11-3 may be energized by the monitor signal Mt to suppress power consumption by these power eating elements, while the BG-type constant voltage circuit 11-1 may be put in constant operation for the reason that it takes some time before it can provide a stable output voltage. In this way, both the quick response capability and power saving capability of the circuit can be accomplished simultaneously. This feature applies to other embodiments.

As a further example, the whole temperature sensor 11 can be put in continuous operation, as shown in (vi) of FIG. 5. In the case, the monitor signal Mt is not supplied to the temperature sensor, but digital temperature data Tdet is outputted from the temperature sensor 11 to the control circuit during a monitoring period. In this configuration, since the temperature sensor is always in operation, necessary temperature data Tdet can be obtained at any time as needed, though power consumption increases accordingly. The feature also applies to other embodiments.

Figure 6:
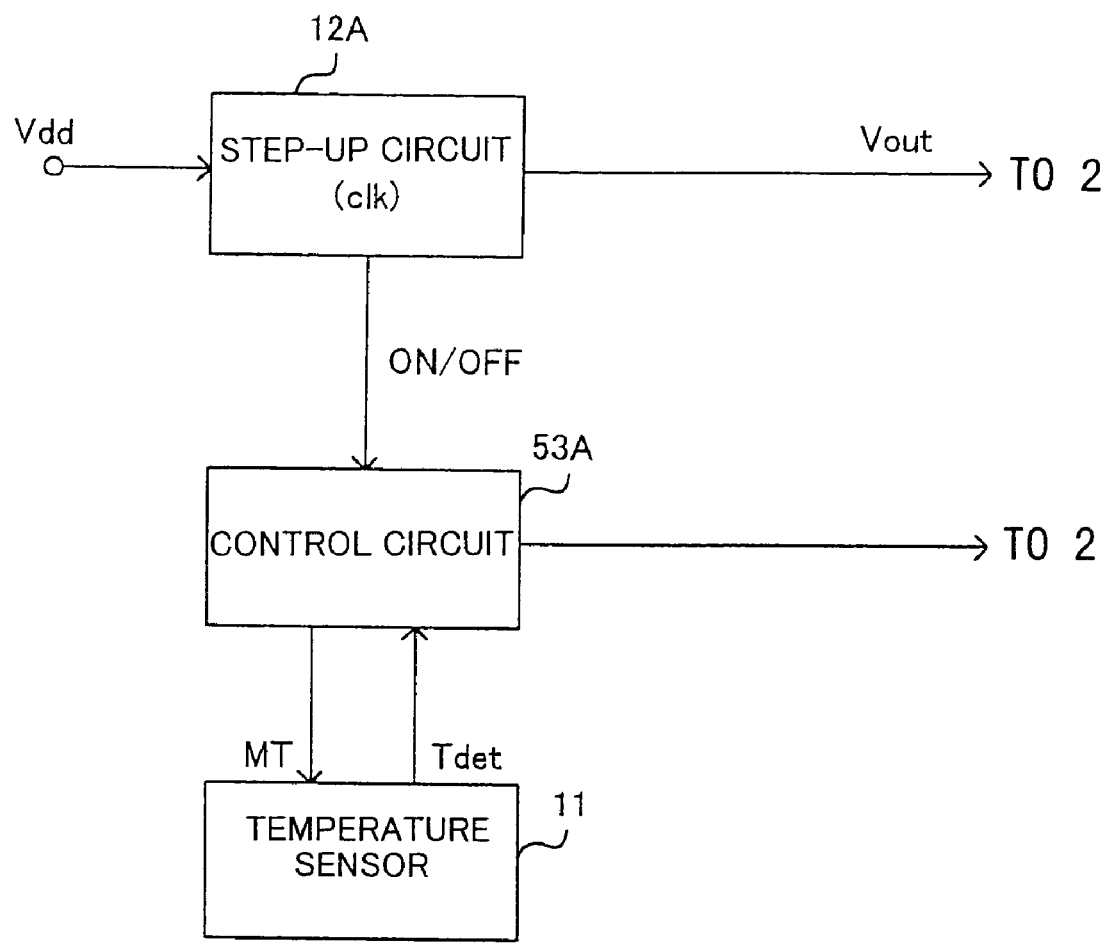
FIG. 6 shows a relevant circuit having a temperature detection function in accordance with a second embodiment of the invention.
Figure 7:
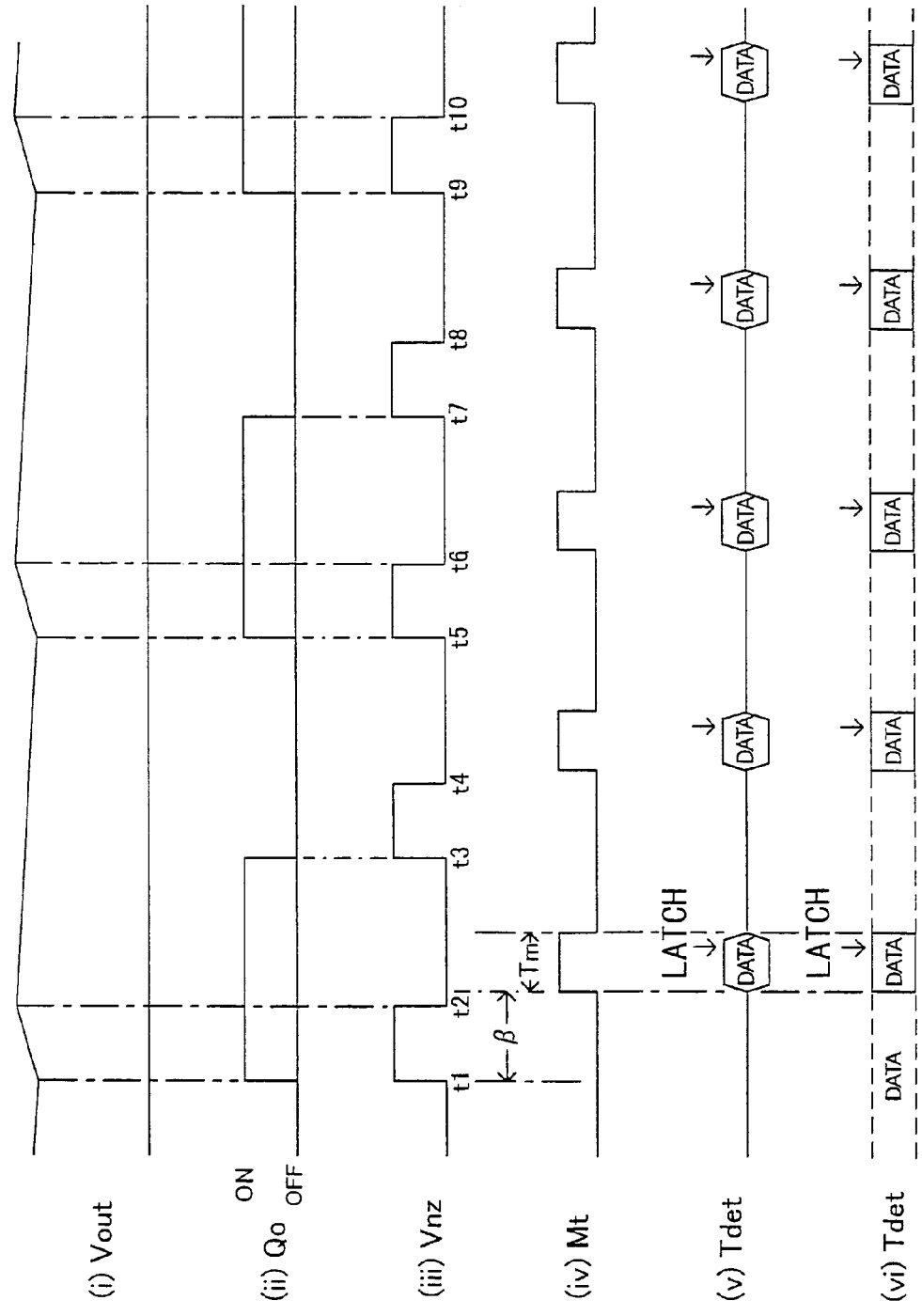
FIG. 7 is a timing diagram of the display apparatus in accordance with another embodiment of the invention.

Referring to FIG. 6, there is shown s block diagram of a temperature sensor 11, a step-up circuit 12A, and a control circuit 53A included in a drive controller 5 for use in a display apparatus in accordance with another embodiment of the invention. The LCD drive and the temperature sensor of this embodiment are the same as the LCD drive shown in FIG. 1 and the temperature sensor as shown in FIG. 4, respectively. FIG. 7 is a timing diagram of the temperature sensor.

The step-up circuit 12A is a second type of step-up circuit having an oscillator OSC in continuous operation. Hence, the embodiment differs from the one shown in FIG. 3 in that an enable signal EN is not supplied but instead a clock signal clk is supplied as ON/OFF signal from the step-up circuit 12A to the control circuit 53A. As compared with the step-up circuit of FIG. 3, capacitances of the capacitors C1-Cn and Co of this embodiment are much larger than those of corresponding capacitors shown in FIG. 3, and accordingly, the oscillation frequency of the oscillator OSC is lower by a factor of 10 or 100 (in the range from 100 Hz to about 10 kHz).

Referring to FIGS. 6 and 7, operation of the display apparatus in accordance with this embodiment will now be described.

Since the step-up circuit 12A is in operation all the time, the output MOS transistor Qo is turned ON and OFF as shown in FIG. 7 by line (ii). The step-up voltage Vout starts charging the capacitor Co at time t1, when the MOS transistor Qo is turned ON, as shown FIG. 7 by line (i). When the voltage across the capacitor Co rises to the maximum voltage at time t2, the charging ends. Subsequently, the voltage gradually decreases with time, in accordance with the power consumption. In the embodiment shown herein, the step-up voltage Vout is not controlled by any feedback loop. Thus, although the maximum step-up voltage Vout depends on the load coupled, it does not change rapidly due to the fact that the capacitor Co has a sufficiently large capacitance.

As stated above, the power source voltage Vdd and the ground voltage fluctuate during the period t1–t2 when the output MOS transistor Qo is turned ON to raise the step-up voltage Vout. The embodiment shown herein may also avoid errors in the digital temperature data Tdet caused by the voltage fluctuation. To do so, the monitor signal Mt is supplied to the temperature sensor 11 after a waiting period β subsequent with reference to the switching ON of the temperature sensor 11, allowing for the fluctuations in the power source voltage Vdd and the ground potential to decay within the waiting period β as shown in FIG. 7 by line (iv). Thus, the monitor signal Mt is outputted only in the periods Tm in which stable digital temperature data Tdet (line (v) of FIG. 7) are available.

A multiplicity of digital temperature data Tdet received from the temperature sensor 11 in the monitoring period Tm are averaged for several times, until a significant mean value is obtained. The mean value thus obtained is latched, and supplied as the temperature data to the temperature compensation circuit 10 of the control circuit 53A.

It is noted that the period from time t3 to t4 also includes a voltage fluctuating period due to the switching of the MOS transistors in the stages that precedes the output MOS transistor Qo. Therefore, the period from t3 to t4 is also avoided to obtain the temperature data Tdet.

In this way, the temperature data of the temperature sensor 11 for use in resetting the drive condition in the temperature compensation circuit 10, is obtained in a period in which the power supply voltage and the ground potential have become stable, that is, in the monitoring period Tm after a predetermined period immediately after the switch of the charge pump type step-up circuit is switched ON. Thus, the influence of the voltage fluctuations and voltage noise generated by the stepping up of a source voltage and appearing on the power supply lines, ground lines, and signal lines can be circumvented. Therefore, adequate temperature compensation can be attained using accurate temperature data.

In the above description of the invention, validity of temperature data have been described in connection with the operational state of the step-up circuit. However, the invention is not limited to the embodiments described above. For example, it suffices to invalidate the temperature data over a period when a large drive current momentarily flows through the display panel, because the temperature data is then easily affected by the voltage noise caused by a momentary large current.

In the embodiment of the invention shown herein, the polarity of voltage applied to the display panel alternates between positive and negative polarities with a predetermined period. It is noted that a fairly large current will flows through the display panel momentarily during switching of the polarity as compared with the current in ordinary driving operation. A large current also flows through the display panel when a common line of the display panel is switched over from one to the other, causing the display elements to be charged or discharged. By invalidating the temperature data while such a momentary large current flows, it is possible to prevent voltage noise from affecting the temperature compensation.

Figure 9:
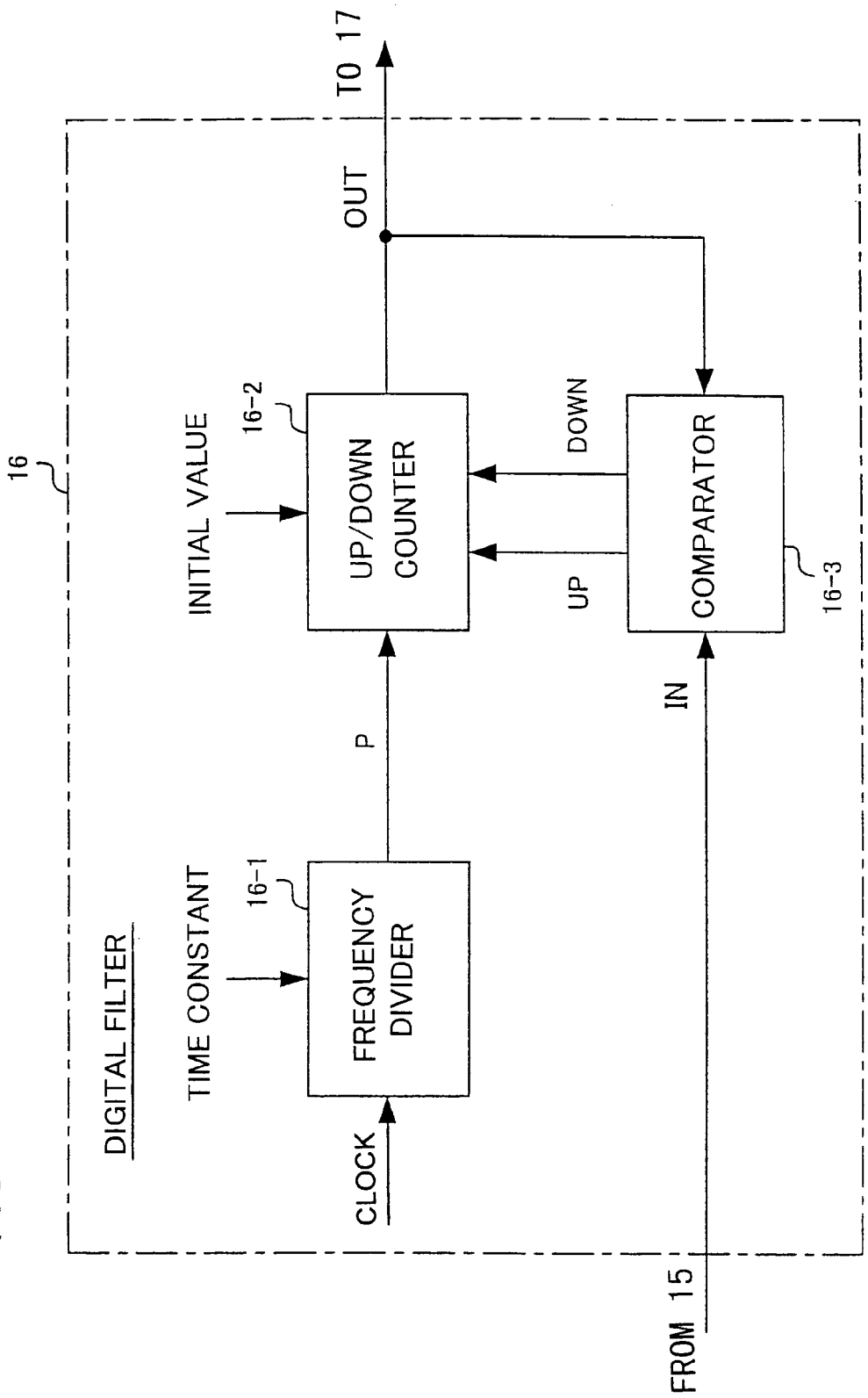
FIG. 9 shows an exemplary digital filter.
Figure 10:
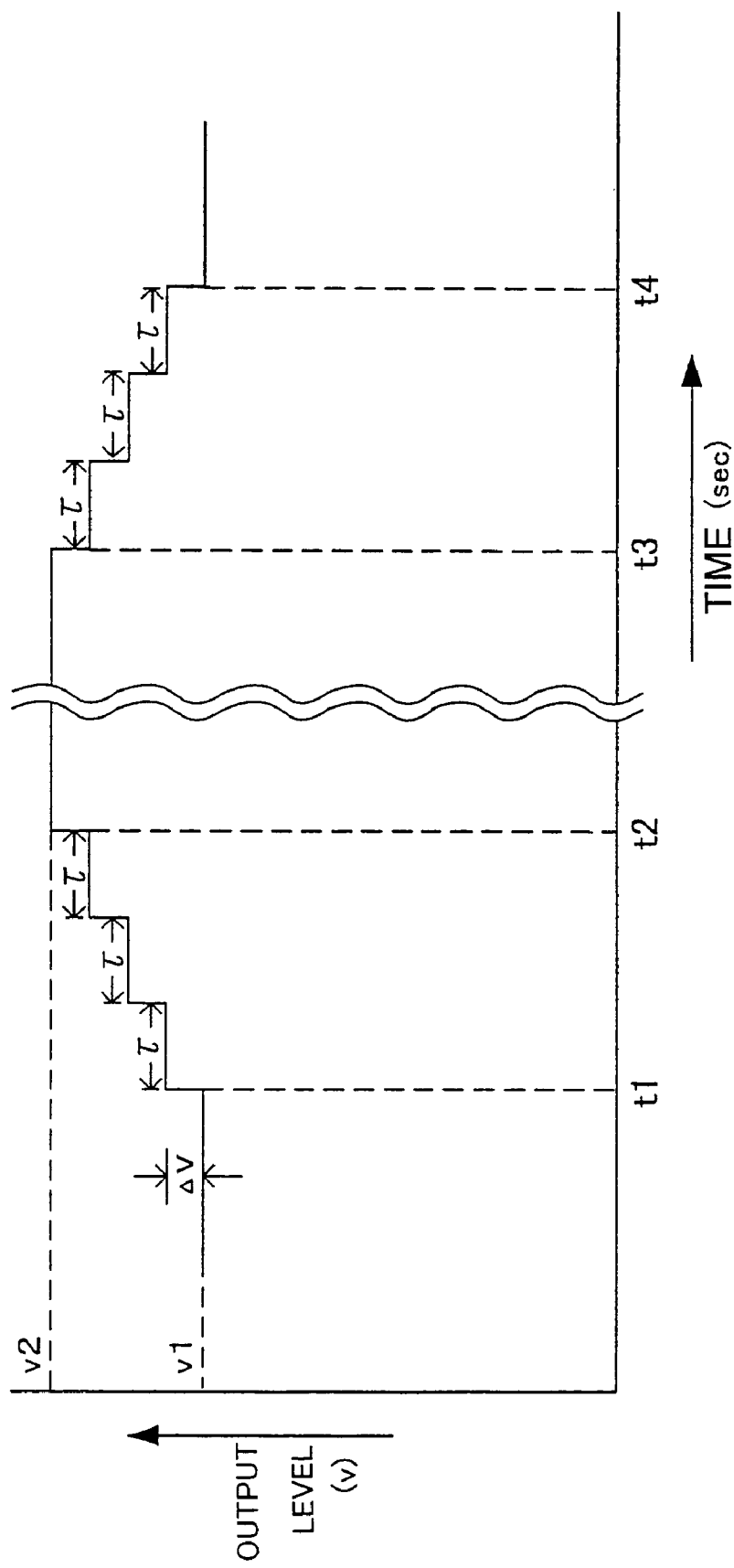
FIG. 10 is a timing diagram of an LCD panel drive.

Next, referring to FIGS. 8–10, a scheme of temperature compensation will be described, in which, if a temperature change is detected, intermediate drive conditions are established for the temperature compensation circuit 10 between an old drive condition set before a temperature change to a new (target) drive condition. The digital temperature data Tdet outputted from the temperature sensor 11 exhibits a finite jump, or changes discontinuously. Such a jump in the temperature data Tdet results in an abrupt change in brightness of a display screen for example. Hence, a sudden noticeable change of brightness will appear on the display if the change is large enough. It is therefore preferable to suppress such sudden change in drive condition using a temperature compensation circuit as shown in FIGS. 8–10, thereby removing unpleasant sensation of viewers.

Figure 8:
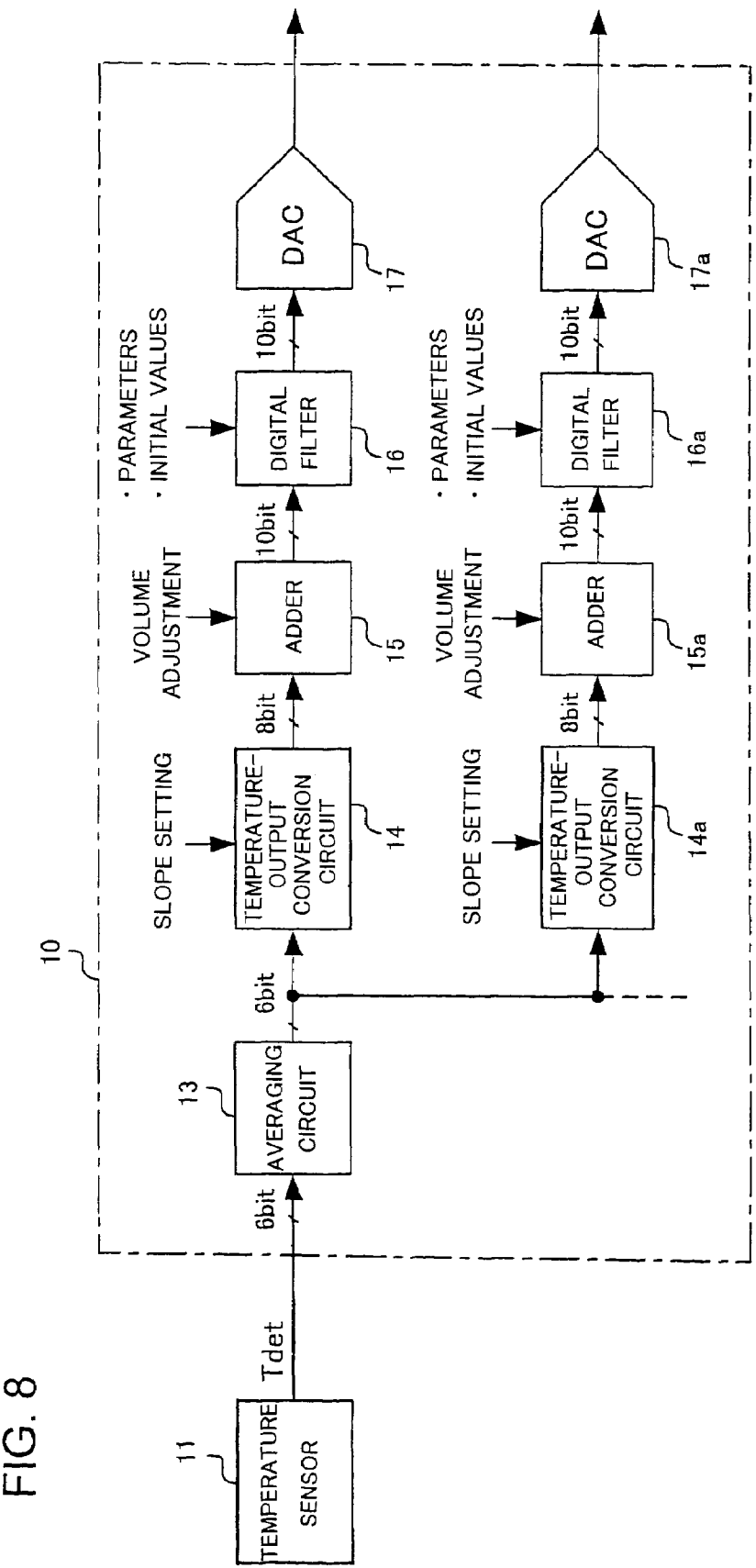
FIG. 8 is a block diagram representation of a temperature compensation circuit according to the invention.

FIG. 8 shows a block diagram of the temperature compensation circuit 10 having multiple temperature compensation families to deal with different drive conditions. In what follows, however, only one temperature compensation family will be described, since all the temperature compensation families are essentially the same in structure.

A multiplicity of k-bit (k=6 for example) digital temperature data Tdet received from the temperature sensor 11 are averaged by an averaging circuit 13 which functions as a noise filter.

A temperature-output conversion circuit 14 is adapted to convert a temperature data into a corresponding voltage data with a prescribed slope, based on pre-installed slope setting data. In response to input digital temperature data, the temperature-output conversion circuit 14 outputs a preliminary drive condition setting value in accord with the temperature data. The preliminary drive condition setting value is an n-bit data (n=8 for example), and has a higher resolution than the input digital temperature data. Any temperature-dependent characteristic (including a linear and a non-linear characteristic) of a display element can be represented by a multiplicity of slope setting data, since any characteristic curve can be defined in terms of its slope or first-order differential. Thus, digital temperature data is converted into preliminary drive condition setting value based on the slope setting data for a particular display panel.

An addition circuit 15 adjusts the volume of preliminary drive condition setting value by adding thereto or subtracting therefrom an arbitrary adjustment value, and outputs an m-bit (m=10 for example) drive condition setting value. The temperature-output conversion circuit 14 and the addition circuit 15 can be integrated to a temperature output conversion means.

A digital filter 16 functions as a means for outputting transitional output. (The filter will be referred to as transitional-output means.) The digital filter 16 receives a drive condition setting value from the addition circuit 15. When the drive condition setting value has changed, at least one intermediate drive condition is set up by establishing an intermediate drive condition setting value between that value set before the change (referred to as old drive condition setting value) and that value in accord with the temperature after the change (referred to as new drive condition setting value). The drive circuit make sequential transition from the old drive condition defined by the old drive condition setting value to the intermediate drive condition defined by the intermediate drive condition setting value, and further to the new drive condition defined by the new drive condition setting value, with a period of time constant $\tau$.

Referring to FIG. 9, there is shown an exemplary digital filter 16, which includes a frequency divider 16-1, an up/down counter 16-2, and a comparator 16-3. The frequency divider 16-1 receives a clock of a fixed frequency and a time constant $\tau$ (of 2 seconds for example) and outputs a pulse signal P every $\tau$ seconds.

The comparator 16-3 receives a drive condition setting value from the addition circuit 15 and an output of the up/down counter 16-2, and compares the two values. The comparator 16-3 outputs an incremental signal UP or a decrease signal DOWN depending on whether the new drive condition setting value has increased (UP) or decreased (DOWN) as compared with the old drive condition setting value.

The up/down counter 16-2 receives a pulse signal P from the frequency divider 16-1 and either the increment signal UP or decrease signal DOWN from the comparator 16-3. Every time a pulse signal P is received, the up/down counter increment or decrease its drive condition setting data by 1 unit (for example, 2 mV) towards said new drive condition setting value or towards said old drive condition setting value, respectively, depending on which of the increment signal UP and decrease signal DOWN is received, but decreases the drive condition setting value by 1 unit (for example, 2 mV) when a decrease signal DOWN is received.

The output of the temperature sensor 11 is 6-bit, and the output of the temperature-output conversion circuit 14 is 8-bit. Therefore, if the output of the temperature sensor 11 increases (or decreases) by 1 unit, the output of the temperature-output conversion circuit 14 is increased (or decreased) by, for example, 4 units. The number of incremental/decreasing units depends on the setting of slope. The drive circuit sequentially undergoes the 4 intermediate drive conditions associated with the 4 drive condition setting values, with a transition period of $\tau$.

The up/down counter 16-2 is initialized to a value associated with a standard temperature. As a consequence, the up/down counter 16-2 is set to the initial value at the beginning of a startup of the apparatus.

An D/A converter 17 converts a digital drive condition setting value into an analog counterpart. For example, an analog drive condition setting value is used as an signal instructing generation of a drive voltage. When digital drive condition setting value is used as it is, the D/A converter 17 is not necessary.

Operation of the temperature compensation circuit 10 of the LCD drive will now be described with additional reference to a timing diagram of FIG. 10.

It is assumed here that the temperature of the display panel has changed and hence the digital temperature data Tdet of the temperature sensor 11 (6 bit data) has changed accordingly. It is further assumed that only the lowest significant bit (LSB) of the temperature data Tdet has changed, considering the fact that temperature normally changes only slowly.

In accordance with the change in the LSB of the temperature data Tdet, the 8-bit preliminary drive condition setting value outputted from the temperature-output conversion circuit 14 is changed. How much the preliminary drive condition setting value changes depends on the particular slope data preset in the temperature-output conversion circuit 14. Presently, it is assumed that the preliminary drive condition setting value changes by 4 LSBs. This change is illustrated in FIG. 10 as a change from an old drive condition setting value v1 to a new drive condition setting value v2. It is noted that the operation of the addition circuit 15 does not affect this change, since the addition circuit 15 only adds or subtracts a fixed quantity to or from a value input to the addition circuit 15.

The new drive condition setting value v2 is inputted into the digital filter 16 as an input signal IN. In the digital filter 16, the comparator 16-3 compares the input signal IN with the output signal OUT (currently old drive condition setting value v1) of the up/down counter 16-2, and generates an incremental signal UP. On the other hand, the frequency dividers 16-1 generates a pulse signal P every time it counts the number of clocks that corresponds to the time constant τ.

As the pulse signal P is inputted at time t1 while the incremental signal UP is outputted, the up/down counter 16-2 increments its count by 1, which causes the output drive condition setting value to be increased by an amount defined by that increment. The amount of increase in drive condition setting value that corresponds to an increment of 1 count is 2 mV for example. Because of this increment of count by 1, the level of the output signal OUT is raised. But since the incoming signal IN has a still higher level than the output signal OUT, further incremental signals UP will be generated.

Under this condition, the count of up/down counter 16-2 is incremented every time a pulse signal P is entered for each time constant τ. Accordingly, the output signal OUT gradually rises from the old drive condition setting value v1 to the new drive condition setting value v2.

Eventually, at time t2 in the example shown, the output signal OUT reaches the new drive condition setting value v2. Since at this moment the input signal IN and the output signal OUT of the comparator 16-3 become equal, no incremental signal UP is outputted any more. This ends the filtering by the digital filter 16.

In this manner, the temperature-output conversion circuit 14 converts a k-bit (6-bit) digital temperature data of the A/D converter into an n-bit (8-bit) drive condition setting value having a higher resolution. The digital filter 16 takes advantage of this difference in resolution to set up multiple intermediate setting values, so that the drive circuit can make sequential transitions over the intermediate levels associated with these intermediate setting values at every time constant of τ. Thus, if the input signal IN changes from the old drive condition setting value v1 to the new drive condition setting value v2 in a single step, the output signal OUT undergoes a corresponding change in multiple steps with a period of τ in accord with the intermediate levels. In this manner, the drive condition of the display apparatus is switched so gently based on reset drive condition setting value that the display seems to change almost continuously.

In the above example, an incremental transition from an old drive condition setting value v1 to the new drive condition setting value v2 has been described. It will be apparent that the same procedure can be applied to the case where a transition is made from an old drive condition setting value v2 to a lesser new drive condition setting value v1, provided that the incremental signal UP is replaced by the decrease signal DOWN.

It will be also apparent that the temperature compensation circuit 10 may have a multiplicity of temperature compensation families associated with different drive conditions, as shown in FIG. 8, in which the temperature compensation circuit 10 has a separate family that comprises a temperature-output conversion circuit 14a, an addition circuit 15a, a digital filter 16a, and a D/A converter 17a, sharing a common temperature sensor 11 and the averaging circuit 13.

What we claim is:

1. A display apparatus, comprising:
    a display panel;
    a display memory for storing contents to be displayed on said display panel;
    a step-up circuit for stepping up a power source voltage to a predetermined step-up voltage;
    a drive circuit receiving said step-up voltage as the drive voltage for driving said display panel based on a drive condition defined by a drive condition setting value to display the contents of said display memory on said display panel;
    a temperature sensor for detecting the temperature of said display panel and outputting temperature data associated with the temperature;
    a temperature compensation circuit for changing said drive condition setting value, when said temperature data has changed in a period of time in which the current for driving said display panel do not change appreciably, from the drive condition setting value set before said temperature data has changed (said value referred to old drive condition setting value) to a drive condition setting value in accord with the temperature after said temperature data has changed (said value referred to as new drive condition setting value); and
    a controller for controlling said display memory, step-up circuit, drive circuit, temperature sensor, and temperature compensation circuit.

2. A display apparatus, comprising:
    a display panel;
    a display memory for storing contents to be displayed on said display panel;
    a step-up circuit having alternating active state and inactive state, outputting a predetermined step-up voltage by stepping up a power source voltage;
    a drive circuit receiving said step-up voltage as the drive voltage for driving said display panel based on a drive condition defined by a drive condition setting value to display the contents of said display memory on said display panel;
    a temperature sensor for detecting the temperature of said display panel and outputting temperature data associated with the temperature;
    a temperature compensation circuit for changing said drive condition setting value, when said temperature data has changed while said step-up circuit is in inactive state, from the drive condition setting value set before said temperature data has changed (said value referred to old drive condition setting value) to a drive condition setting value in accord with the temperature after said temperature data has changed (said value referred to as new drive condition setting value); and a controller for controlling said display memory, step-up circuit, drive circuit, temperature sensor, and temperature compensation circuit.

3. The display apparatus according to claim 2, wherein said temperature sensor is operated only in a predetermined period within an inactive period of said step-up circuit but not in a predetermined initial segment of said inactive period.

4. The display apparatus according to claim 3, wherein
the step-up voltage of said step-up circuit is compared with a predetermined reference voltage; and said step-up circuit is controlled to have active and inactive states based on said comparison such that said step-up voltage remains within a predetermined range with respect to said reference voltage.

5. The display apparatus according to claim 4, wherein said step-up circuit is a charge pump type step-up circuit
that comprises a multiplicity of charge pump units connected in series and an oscillator for generating a clock to be supplied to said charge pump units; and activation and inactivation of said step-up circuit is controlled by the ON-OFF operation of said oscillator based on said comparison.

6. The display apparatus according to claim 3, wherein said temperature sensor is provided with:

a band-gap type constant voltage circuit for generating a constant band-gap voltage which is little susceptible to temperature variation; and a temperature detection circuit including at least one diode for passing therethrough a constant current to generate a voltage drop across said at least one diode, said temperature detection circuit adapted to generate a thermosense-voltage which varies with the ambient temperature, using said band gap voltage and said voltage drop across said diode.

7. The display apparatus according to claim 3, wherein said temperature sensor is periodically operated with a predetermined period of time that includes a multiplicity of inactive periods of said step-up circuit.

8. The display apparatus according to claim 2, wherein said temperature sensor is continuously operated; and only the temperature data that is obtained in a predetermined period within an inactive period of said step-up circuit but not in a predetermined initial segment of said inactive period is used as the temperature data for changing said drive condition setting value to said new drive condition setting value.

9. The display apparatus according to claim 2, wherein said temperature compensation circuit establishes at least one intermediate drive condition setting value between said old drive condition setting value and said new drive condition setting value so that said drive circuit undergoes sequential transitions from the drive condition defined by said old drive condition setting value to the new operating condition defined by said new drive condition setting value via the intermediate drive condition defined by said at least one intermediate drive condition setting vale, with a predetermined transition period.

10. The display apparatus according to claim 9, further comprising a multiplicity of said temperature compensation circuits in accordance with a multiplicity of different drive conditions, wherein said multiplicity of temperature compensation circuits receive the same temperature data from a common temperature sensor.

11. The display apparatus according to claim 9, wherein said temperature compensation circuit includes:

a temperature-output conversion circuit for converting k-bit digital temperature data into m-bit (m>k) drive condition setting value based on drive condition setting information that contains slope data; and a transitional output circuit for causing, upon receipt of drive condition setting value from said temperature-output conversion circuit based on parameters that include a time constant, said drive circuit to undergo sequential transitions from the drive condition defined by said old drive condition setting value to the new operating condition defined by said new drive condition setting value via the intermediate drive condition defined by said at least one intermediate drive condition setting vale, with a transition period.

12. The display apparatus according to claim 11, wherein said transitional output circuit includes:

a frequency divider receiving a clock of fixed frequency and said time constant, for outputting a pulse signal at every time constant;

a comparator, receiving driving condition setting value from said temperature-output conversion circuit, for outputting either an incremental signal or a decrease signal depending on whether said new drive condition setting value is larger or smaller than said old drive condition setting value; and an up/down counter included in said transitional output circuit and receiving a pulse signal from said frequency divider and either said increment signal or decrease signal from said comparator, said up/down counter adapted to increment or decrease its drive condition setting data by 1 unit, depending on which of the increment signal and decrease signal is received, every time said pulse signal is received.

* * * * *